United States Patent
Baker et al.

(10) Patent No.: US 9,762,017 B2
(45) Date of Patent: Sep. 12, 2017

(54) POWER TRANSFER UNIT

(71) Applicant: TETRA LAVAL HOLDINGS & FINANCE S.A., Pully (CH)

(72) Inventors: Nick Baker, Ystad (SE); Jonas Ståhl, Harlösa (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 383 days.

(21) Appl. No.: 14/127,594

(22) PCT Filed: Oct. 11, 2012

(86) PCT No.: PCT/EP2012/070143
§ 371 (c)(1),
(2) Date: Dec. 19, 2013

(87) PCT Pub. No.: WO2013/053810
PCT Pub. Date: Apr. 18, 2013

(65) Prior Publication Data
US 2014/0220791 A1    Aug. 7, 2014

(30) Foreign Application Priority Data

Oct. 13, 2011    (SE) ...................................... 1150953

(51) Int. Cl.
| | |
|---|---|
| *B32B 37/00* | (2006.01) |
| *H01R 41/00* | (2006.01) |
| *H01R 39/64* | (2006.01) |
| *B65B 51/18* | (2006.01) |
| *B29C 65/18* | (2006.01) |
| *B29C 65/30* | (2006.01) |

(Continued)

(52) U.S. Cl.
CPC ............. *H01R 41/00* (2013.01); *B65B 51/18* (2013.01); *H01R 39/64* (2013.01); *B29C 65/18* (2013.01);

(Continued)

(58) Field of Classification Search
CPC .......... H01R 41/00; H01R 39/64; B65B 51/18
(Continued)

(56) References Cited

U.S. PATENT DOCUMENTS

| | | |
|---|---|---|
| 3,420,035 A | 1/1969 | Deans et al. |
| 3,553,059 A | 1/1971 | Stohlquist |

(Continued)

FOREIGN PATENT DOCUMENTS

| | | |
|---|---|---|
| EP | 0 887 265 A1 | 12/1998 |
| EP | 0 887 270 A1 | 12/1998 |

(Continued)

OTHER PUBLICATIONS

International Search Report (PCT/ISA/210) mailed on Dec. 10, 2012, by the European Patent Office as the International Searching Authority for International Application No. PCT/EP2012/070143.

*Primary Examiner* — James Sells
(74) *Attorney, Agent, or Firm* — Buchanan Ingersoll & Rooney PC

(57) ABSTRACT

The disclosure relates to a power-transfer unit for a sealing unit of a packaging machine comprising a support, intended to be attached to a sealing unit, a power bar comprising a contact-initiation section, a contact-termination section, and an intermediate section therebetween, the power bar being resiliently suspended in the support and being movable along a first direction being normal to a contact surface of the intermediate section. The power bar is suspended in the support by a first leaf spring.

20 Claims, 3 Drawing Sheets

(51) Int. Cl.
    *B29C 65/36*   (2006.01)
    *B29C 65/00*   (2006.01)
    *B65B 51/26*   (2006.01)
    *H01R 39/39*   (2006.01)

(52) U.S. Cl.
    CPC .............. *B29C 65/30* (2013.01); *B29C 65/36* (2013.01); *B29C 66/1122* (2013.01); *B29C 66/4312* (2013.01); *B29C 66/72321* (2013.01); *B29C 66/72328* (2013.01); *B29C 66/73921* (2013.01); *B29C 66/83533* (2013.01); *B29C 66/849* (2013.01); *B65B 51/26* (2013.01); *H01R 39/39* (2013.01)

(58) Field of Classification Search
    USPC ............................................... 156/580, 583.1
    See application file for complete search history.

(56) References Cited

U.S. PATENT DOCUMENTS

| | | |
|---|---|---|
| 4,221,282 A | 9/1980 | Wampfler |
| 4,546,595 A | 10/1985 | Yasumune et al. |
| 6,085,495 A | 7/2000 | Fontanazzi et al. |
| 6,112,498 A | 9/2000 | Hansson et al. |
| 6,450,088 B1 * | 9/2002 | Hutchinson ......... B29C 66/0042 100/320 |
| 6,625,517 B1 | 9/2003 | Bogdanov et al. |

FOREIGN PATENT DOCUMENTS

| | | |
|---|---|---|
| FR | 2 257 196 A7 | 8/1975 |
| JP | 6-215844 A | 8/1994 |
| WO | WO 00/64662 A2 | 11/2000 |

\* cited by examiner

POWER TRANSFER UNIT

TECHNICAL FIELD

The present invention relates to an induction heating power transfer unit, and in particular to such unit for use in packaging units used for continuously forming sealed packages from a tube of packaging material for containment of pourable food products.

BACKGROUND ART

Within the field of packaging food products, and in particular packaging such products under aseptic conditions use is often made of sterilized packaging containers, such as Tetra Brik Aseptic (registered trademark). Tetra Brik Aseptic, as well as similar packages, may be manufactured by forming and scaling a strip-rolled packaging material. The packaging material comprises a layer of fibrous material, such as paper, sandwiched between two or more layers of thermoplastic, such as polyethylene. The side of the packaging material to be contacted by product may also comprise a barrier material layer, such as an aluminum layer, which in turn is covered by a layer of thermoplastic material.

In a typical packaging process the packaging material is sterilized, whereafter the two longitudinal edges of the packaging material are joined such as to form a continuous tube. The tube of packaging material is filled with product, usually sterilized product, after which the tube is provided with transversal seals such as to form pillow-shaped packages that may be severed from the continuous tube and folded into individual packaging containers. The present invention has an immediate application in the transversal sealing of the tube, yet it may be used for transfer of power for all types of induction heating sealing systems, or all types of sealing systems in general.

In the context of transversal sealing packaging machines are known comprising two opposing chain conveyors, each defining an endless path. The two chain conveyors comprise opposing sealing jaws and counter-jaws, respectively, such that the tube of packaging material may be clamped between a sealing jaw and a counter jaw and exposed to a sealing action in order to form packaging containers. There are a number of options available for the sealing action, such as direct heating of the packaging material, and inductive heating of the packaging material, both well-known within the present field.

In both of these examples power, or current, has to be transferred to the sealing jaw, i.e. transferred from a stationary source of energy to a moveable device. This transfer of energy may be effected in various ways, e.g. in a first method, the jaws fitted with the heating means are also fitted with brushes preferably made of carbon, and which, along a predetermined portion of their travel, slide along respective copper power bars fixed to the packaging machine frame.

Though functional and efficient there is always room for improvement e.g. in terms of operational lifetime of the device. Packaging units incorporating this type of power transfer systems are disclosed in EP-A-0 887 265 and in EP-A-0 887 270, by the present applicant, and are considered to be well-known to the skilled person.

A second method has been developed wherein electric energy is transferred from the stationary energy source to the movable device by electromagnetic induction. One example of this method applied to chain-type packaging machines is described in Patent Application WO 00/64662.

SUMMARY

To this end an inventive power-transfer unit comprises a support and a power bar resiliently suspended in the support and movable along a first direction, towards the brush. The power bar comprises a contact-initiation section, a contact-termination section, and an intermediate section therebetween. An inventive power-transfer unit is characterized in that the power bar is suspended in the support by means of a first leaf spring. The first direction represent the direction of movement of the power bar, and consequently the direction along which it may be biased by the leaf spring if moved from a relaxed position. The first direction normally corresponds to a direction normal to a contact surface of the intermediate section.

Preferred embodiments of the present invention are described in the following.

Advantages of the present invention as well as of the preferred embodiments thereof will be clear from the detailed description of an embodiment.

According to one or more embodiments the leaf spring may extend along a rectilinear path between the support and the power bar, and in a further embodiment the power bar may be suspended in the support by means of an additional second leaf spring.

In one or several embodiments a coil spring may be arranged between the support and the power bar to provide a biasing force in said first direction, and it is preferred that the coil spring provides a positive spring force.

In one or more related embodiments the coil spring is angled relative to the first direction, to provide a force component in said first direction which is compensated for the increase spring force provided by the coil spring as it is compressed, and thereby to offer a more even force.

In at least one embodiment a braided material may be used to transfer electrical power to the power bar, and in related embodiments the braided wire may be a wire braid comprising tin plated, silver plated or tin and silver plated filaments.

In one or more embodiments either one of the leaf springs may be used to transfer electrical power to the power bar.

In several embodiments the contact-initiation section and the contact-termination section are provided by a ramp sloping in and reverse to the first direction, respectively. In some of these embodiments the combined length of the contact-initiation section and the contact termination section corresponds to about half the length of the intermediate section.

In a specific embodiment the shape of the ramps is such that the resulting acceleration upon contact between the brush and the power bar is about 1 G or less.

In a practical embodiment for one type of packaging machine support comprises two power bars.

The present invention also relates to a power bar according to claim 11.

A power-transfer unit according to the present invention or embodiments thereof increases the operational lifetime of the unit and ensures improved contact between movable components, with a significant reduction in parts.

BRIEF DESCRIPTION OF THE ACCOMPANYING DRAWINGS

The present invention will now be described in greater detail herein below, with particular reference to the accompanying schematic Drawings. In the accompanying Drawings.

DETAILED DESCRIPTION OF EMBODIMENTS

Figure 1:
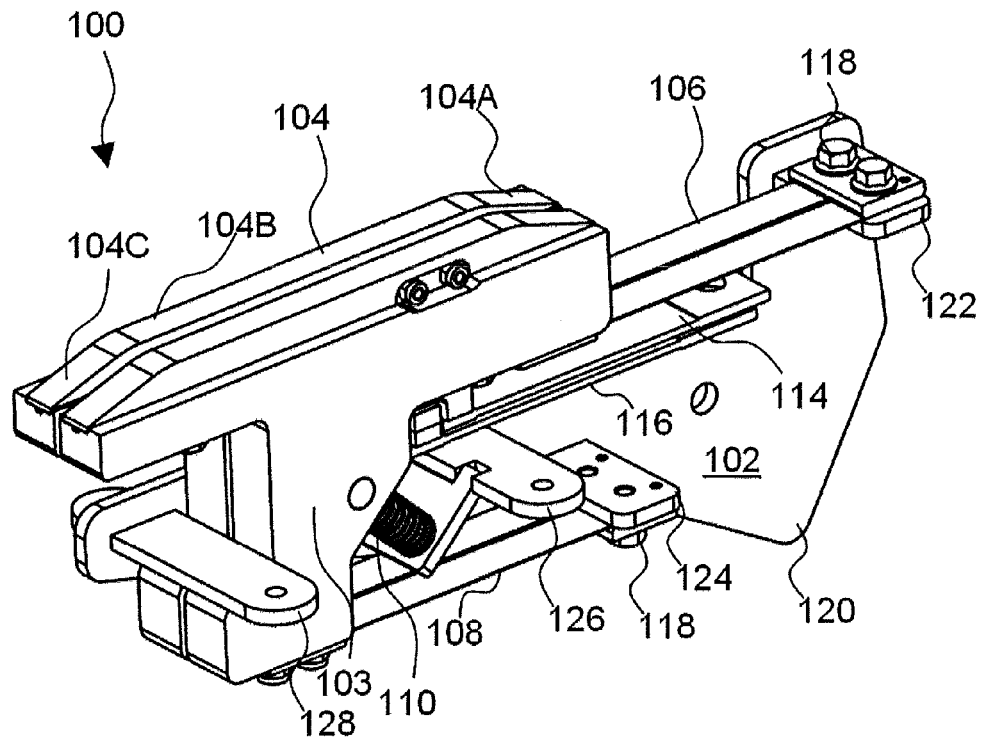
FIG. 1 is a perspective view of power-transfer unit according to a first embodiment of the present invention.

FIG. 1 is a perspective view of a first embodiment of the present invention, and it will be used to motivate advantages related to various (several) embodiments of the present invention.

In the first embodiment a power-transfer unit 100 comprises a support 102 and a power bar 104. In the present embodiment the power bar 104 may be said to comprise a conductor part made from copper or another suitable electrically conductive material, and an isolator part 103, of which the conductor part obviously is the part that in use is energized. A first leaf spring 106 interconnects the power bar 104 and the support 102. The first leaf spring 106 provides a resilient suspension that may be biased in the directions of the planar surfaces of the leaf spring 106 (up or down in the view of FIG. 1), and it also provides a suspension which is rigid in the cross directions of these planar surfaces. Further, in the relative short-stroke movement of the power bar 104 the first leaf spring 106 provides a superior alternative to a more complex suspension using coil springs and pivot points.

The beneficial effects of the first leaf spring 106 may be enhanced by the arrangement of a second leaf spring 108 interconnecting the power bar 104 and the support 102. The arrangement of the second leaf spring 108 further reduces the freedom of movement of the power-bar, such that it may essentially only move up and down in the first direction, as limited by the constant radii provided by each leaf spring 106, 108. In particular, the addition of the second leaf spring 108 reduces any torsion along the length direction of the leaf spring 106 or any bending of the leaf spring 106. Furthermore, arranging two equally long leaf springs in parallel but separated in the first direction, provides a means of maintaining the orientation of the power bar 104, meaning that the power bar will not rotate in the plane of FIG. 2. This ensures good contact between the power bar 104 and a brush of a sealing jaw.

These beneficial effects are even further enhanced by the use of leaf springs 106, 108 extending along rectilinear paths between the support 102 and the power bar 104, as is the case in this first embodiment. The straight leaf springs 106, 108 will be less prone to extension or contraction as compared to leaf springs having a more complex shape. This effect is noticeable even if only one leaf spring 106 is used.

Figure 4A:
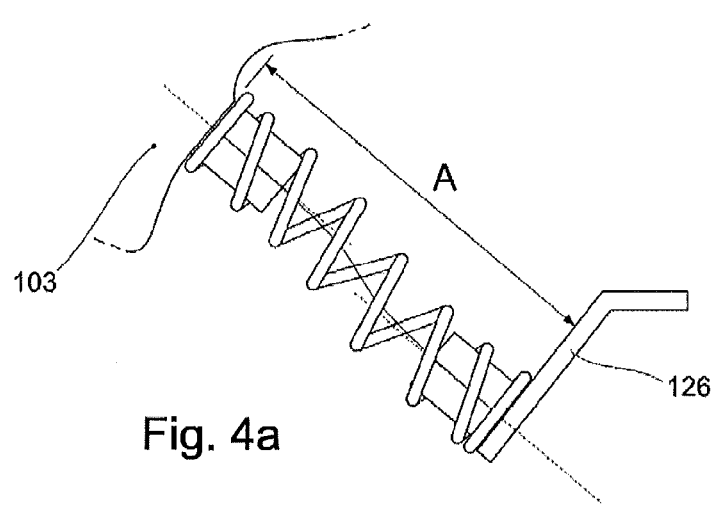
FIGS. 4*a*, 4*b* and 4*c* are side views of a spring of the power-transfer unit according to the invention.
Figure 4B:
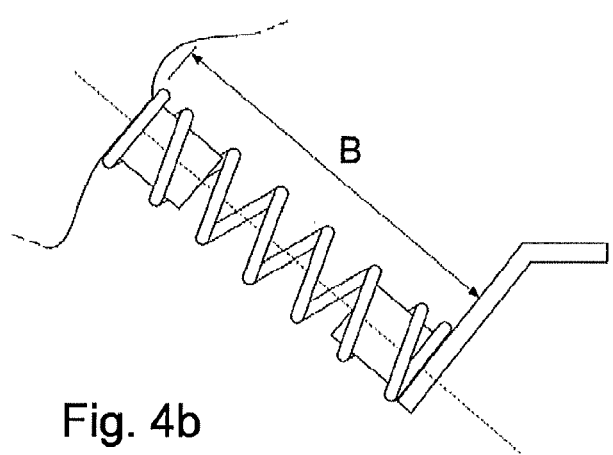
Figure 4C:
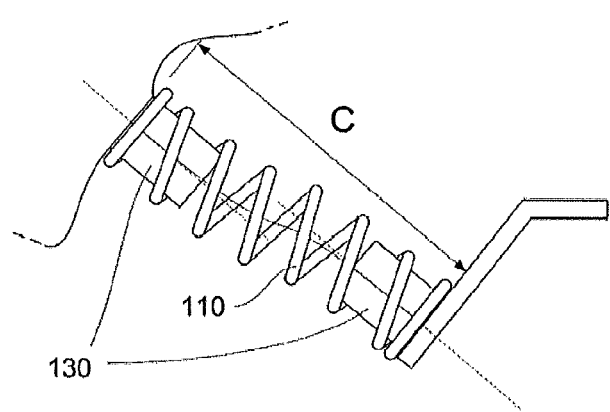

In order to be able to modulate a biasing force with which the power bar is biased in a first direction towards a cooperating brush, a coil spring 110, providing a positive pushing force in the first direction, may be arranged between the support 102 and the power bar 104. The coil spring 110 preferably extends in the first direction. In order to guide the coil spring 110 a guide pin 130 may be arranged to extend inside along a central axis of the coil spring 110, as can be seen in FIGS. 4*a*, 4*b* and 4*c*. For the sake of simplicity only one of each component has been numbered in the drawings of the present application, though it is obvious that most components occur in duplicate (one for each power bar). It should be noted that in FIG. 1 the reference numeral 110 refers to a coil spring arranged on a power bar next to the power bar 104, since the coil spring cooperating with the power bar 104 is hidden. For the purposes of understanding the construction of the present embodiment, this is not believed to pose any problem. This second power bar is suspended in a way identical to the power bar 104.

As the coil spring 110 is compressed its resulting spring force will increase, yet simultaneously its angle relative to the direction of movement of the bar 104 will increase, and thereby also its force component in this direction. Accordingly this arrangement may provide a close to linear (constant) force component throughout the compression of the spring 110, i.e. may result in a constant force in the direction of movement of the bar 104, which direction may also be referred to as the normal direction of the bar 104.

In the case the coil spring 110 is mounted on guide pins 130 at either end, one at the support 102 and one attached to a mount 126, the coil spring 110 may initially have a slight s-shape, as can be seen in FIG. 4*a*. This is clearly indicated by the central axes X, Y of the guide pins 130 not being aligned. As the power bar 104 is moved downwards, as seen in FIGS. 4*b* and 4*c*, the coil spring 110 will first straighten out and will thereafter be s-shaped in the other direction. This curving of the coil spring will act to reduce the increase of the spring force in the opposite direction, such that an almost constant spring force is acting on the power bar 104. This will also counteract the additional force that is added by the leaf springs 106, 108 being bent.

The bending of the coil spring 110, as shown in FIG. 4*b*, also has the effect of reducing the force component acting in the first direction, and instead increase the force component acting in the perpendicular direction, as shown in FIGS. 4*a*, 4*b* and 4*c*. A similar effect had been achieved if the coil spring 110 had been pivotally attached at either end, such that only pure compression of the coil spring would occur. Both these effects are achieved by installing the coil spring 110 at an angle to the direction in which the biasing force is wanted, and which angle increases during compression of the coil spring, as is mentioned above.

The conductor part of the power bar 104 comprises three operation portions;

a contact-initiation portion 104A in the form of a ramp sloping upwards in the first direction, where the contact pressure between the power bar 104 and a cooperating brush may gradually increase, a contact-termination portion 104C in the form of a ramp sloping downwards in the first direction, where the contact pressure between the power bar 104 and a cooperating brush may gradually decrease to zero, and an intermediate zone 104B where said contact pressure may remain constant.

This design is the provision of a gentle and stable contact between the power bar 104 and the brush, which lengthens the lifetime of the brush, and of the power transfer device, since rapid changes of pressure and impacts to the system are reduced.

In the present embodiment the total length of contact-initiation portion 104A and the contact-termination portion 104C combined corresponds to about half the length of the intermediate portion 104B. Within the context of the present embodiment "corresponds to about" may be defined such that half the length of the portion 104B falls within the range of 80% to 120% of the combined length of the portions 104A and 104C, or:

$$0.8 \times (l_{104A} + l_{104C}) < 0.5 \times l_{104B} < 1.2 \times (l_{104A} + l_{104C})$$

For the present embodiment this will result in an acceleration for the power bar 104 of less than 1G when the brush and the bar contact each other at full speed, and this is presently the general criterion which has proven beneficial. In the present embodiment this will eliminate the bar assembly from "bouncing", which is a highly unwanted feature. Parameters relating to the contact between the brush and the bar will obviously depend on e.g. the relative velocity of these two components.

It should be noted that even in the full complexity of the disclosed embodiment it offers an excellent movement that may be constrained without a single bearing or bush and without any pivot point. The number parts used, as compared to conventional devices, are significantly reduced, and the non-complex mechanics also vouches for low wear, as well as low effect of any occurring wear. The force is provided by coil springs in compression, and due to the design of the springs, the force is very consistent over the distance of the travel (the stroke). Instead of bearings and linkages, leaf springs are used, and these also ensure that the system only moves in the desired direction. Power for the power bar 104 may be transferred along the leaf springs—removing the need for a conventional busbar, yet a conventional busbar may still be used instead.

The preferable means for transferring current to and from the power bar 104 is by using braided material. In the present embodiment wire braids 114, 116 are used for this purpose. The braids 114, 116 in the present embodiment have braided copper filaments with shoes arranged at both ends (for attachment purposes), and the entire braid is tin plated and silver plated in order to provide some degree of corrosion resistance. The dimensions and material of the braid may vary between applications, yet for the present embodiment where a current in the order of 100 A is transferred at about 3 Hz and a pulse length of about 150 ms a filament width of 0.15 mm and braid dimensions of about 1.5 mm×26 mm has been found suitable. That particular braid consists of 1056 such filaments arranged in 48 bundles, resulting in a surface area being more than 10 times larger than what would have been the case for a single conductor of the same total dimensions. The braid 114, 116 as such is flattened to an elongate cross section. In another embodiment the diameter of each filament is 0.10 mm arranged in 35 bundles of 125 threads, resulting in that both the number of filaments and the effective surface area is greatly increased.

The braid has proven itself superior compared to conventional busbars or other solid conductors in regard of its capability of transferring high currents without becoming overheated. Part of the explanation may be found in the fact that the braid provides a significantly larger surface area, as illustrated by the example above.

Another key to the capability of transferring high currents is that the braids are arranged in parallel, facing each other in a close relationship, as is shown in FIG. 1. This will reduce the induced eddy currents, and thereby the heat generated during operation of the device. Since excessive heat generation is detrimental for the lifetime of the conductor the use of braids arranged in this manner may be advantageous in many applications of embodiments of the present invention. The choice of plating may depend on the environment in which the power-transfer unit will be arranged and the present invention should not be limited to the specific example given. In a typical installation the power-transfer unit is arranged in a potentially hostile environment where splashing and flushing of corrosive liquids may occur. In less hostile environments the braid may not have to be plated at all.

Returning to the support 102, and its design in the first embodiment: Though the support 102 as such may have another design than the one presented in the drawings, there are some advantages associated with how it is constructed. It has a support base 120, in the form of a plate, from which support mounts 122, 124, 126, 128 extend onto which the leaf springs and the coil spring are mounted. This asymmetric design leaves one side readily accessible for service and maintenance, if necessary. The mount 126 onto which the coil spring 110 is mounted may in one or more embodiments comprise two portions, a first portion being rigidly attached to the support base 120 and a second portion being rigidly attached to the first portion. In another embodiment the first and second portion are replaced by a single portion. One mount 128 is arranged for limiting the stroke of each power bar 104. In one or more embodiments a first of the two power bars 104 comprises a stud (not shown) extending in the direction of the second power bar. The second power bar is provided with an oblong slot (not shown) having its longitudinal extension in the direction of movement of the power bar (essentially up-down in the view of FIG. 2, corresponding to the normal direction of the bar 104), and the stud extends into the slot. In this way the position of the first power bar in relation to the second power bar is limited, such as to avoid excessive movement which potentially could result in a short circuit while still allowing each power bar to move independently from the other on a small scale. With a different design of the power transfer (the conductors) the risk of having a short circuit may not be an issue.

Figure 2:
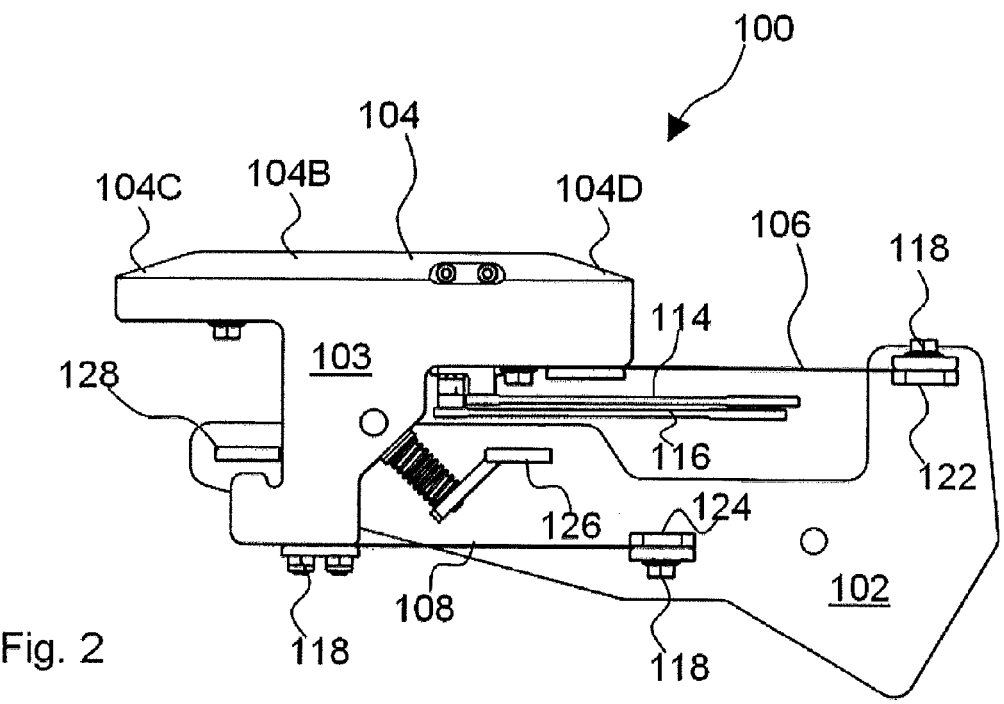
FIG. 2 is a side view of the power-transfer unit of FIG. 1

FIG. 2 illustrates side view of the first embodiment, and has been added with the purpose of further explaining the construction of the power-transfer unit 100.

Figure 3:
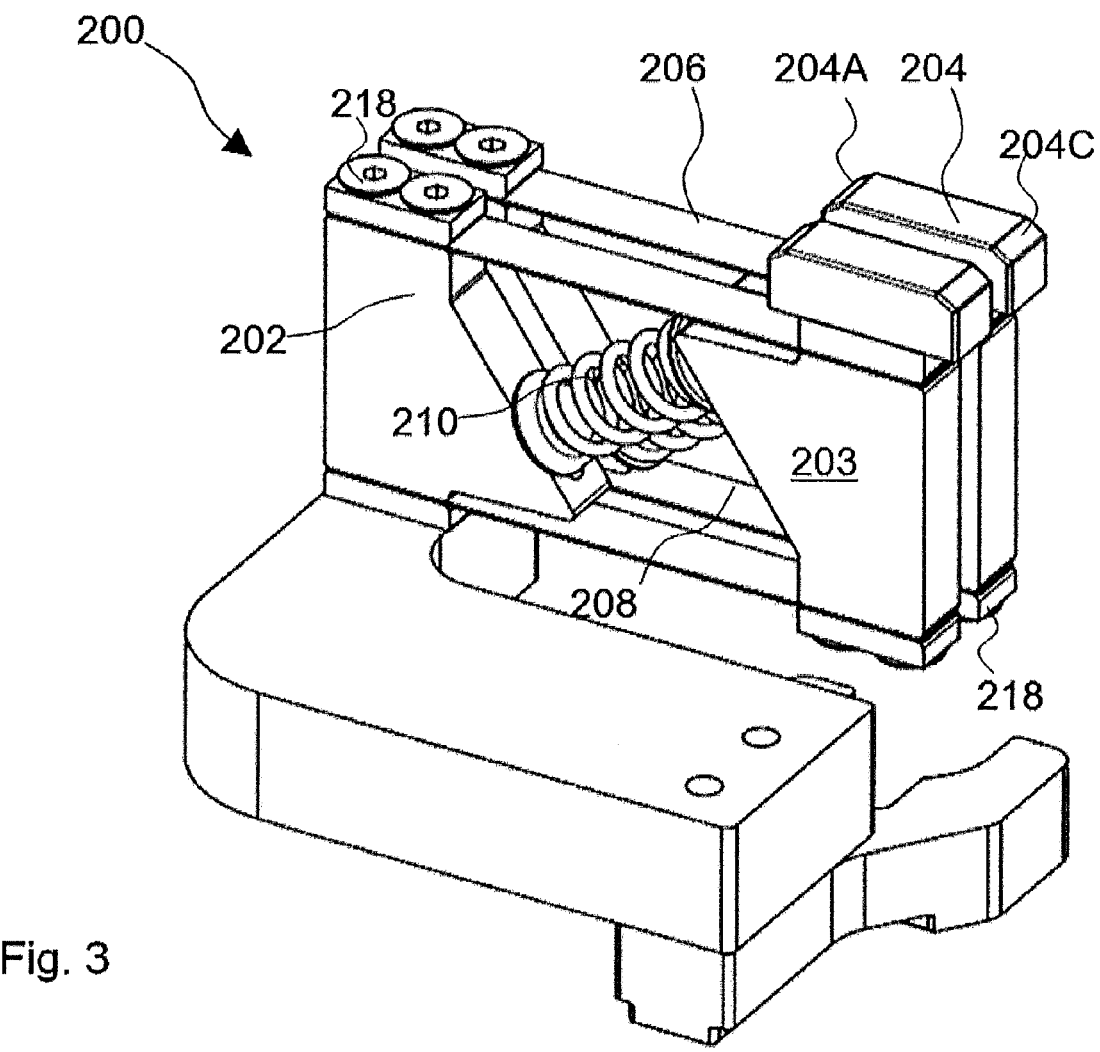
FIG. 3 is a perspective view of power-transfer unit according to a second embodiment of the present invention.

FIG. 3 is a perspective view of a device according to a second embodiment of the present invention. This device is quite similar to the one of the first embodiment, yet it has a more compact design. For the understanding reference is therefore made to the description of FIGS. 1 and 2. Similar components have been given the same reference numeral, increase by 100. In this second embodiment, instead of using separate conductors the leaf springs are used for conducting the current to the power bars 204. In this context that one decisive parameter in regard of using separate conductors or the leaf springs for conducting the current is the amount of current required. Therefore, for some applications the power-transfer unit 200 of the second embodiment may be provided with separate conductors (e.g. the braid of the first embodiment), and the power-transfer unit 100 of the first embodiment may in some embodiments not require separate conductors. In FIG. 3 it is readily observable how the relationship between the lengths of the various portions, 204A, 204B, 204C, of the power bar 204 is quite different in comparison with the first embodiment. Again, this relationship will vary between different applications and in alternative designs of the second embodiment the relationship may differ from what is illustrated in FIG. 3.

Selecting material for the components of a power-transfer unit of the present invention is believed to be within the capabilities of the skilled person. It is preferable that the selected materials are durable, yet apart from that many different combinations are possible. Most components are preferably made of a stainless material, which is considered beneficial for the electrical properties of the system, apart from the obvious advantages. The leaf springs and the coil springs are thus preferably made from stainless spring steel. The support base 120 is preferably made from stainless steel, as are the nuts and bolts. The power bars 104, 204 may be made from a blend of copper, and in one preferred embodiment the material is a beryllium free copper alloy, such as the alloy provided under the trade name Albromet W200.

The isolator part 103, 203 may preferably be formed from a plastic material, and in such a case it should be a plastic material able to cope with the stress, temperature and humidity present during operation. For the illustrated embodiments Polyvinylidene Fluoride (PVDF) may be a suitable choice.

The skilled person realizes that the given examples are not more than examples given with the intent of disclosing a functional embodiment of the invention, and that the suggested materials or embodiments should not be construed as limiting for the present invention.

The invention claimed is:

1. A power-transfer unit for a sealing unit of a packaging machine comprising
    a support, intended to be attached to a sealing unit,
    a power bar comprising a contact-initiation section, a contact-termination section, and an intermediate section therebetween, said power bar being resiliently suspended in the support and being moveable along, a first direction being normal to a contact surface of said intermediate section,
    wherein the power bar is suspended in the support by means of a first leaf spring.

2. The power-transfer unit of claim 1, wherein the first leaf spring extends along a rectilinear path between the support and the power bar.

3. The power-transfer unit of claim 1, wherein the power bar is suspended in the support by means of an additional second leaf spring.

4. The power-transfer unit of claim 3, wherein the second leaf spring has substantially the same length as the first leaf spring, and is arranged in parallel with the first leaf spring, but separated a distance in the first direction, such as to prevent rotation of the power bar in a plane defined by a central axis of the first leaf spring and a central axis of the second leaf spring.

5. The power-transfer unit of claim 1, wherein a coil spring is arranged between the support and the power bar to provide a biasing force in said first direction.

6. The power-transfer unit of claim 5, wherein the coil spring provides a positive expansion force, and comprises a spring guide extending along a central axis of the coil spring.

7. The power-transfer unit of claim 5, wherein the coil spring is arranged at an angle to said first direction.

8. The power-transfer unit of claim 7, wherein the coil spring is arranged to increase its angle to said first direction when the power bar is depressed.

9. The power-transfer unit of claim 1, wherein separate conductors are arranged for transfer of electrical power.

10. The power transfer unit of claim 9, wherein two braids are used for transfer of current to and from the power bar, respectively.

11. The power transfer unit of claim 10, wherein the two braids are arranged in parallel, facing each other.

12. The power-transfer unit of claim 1, wherein either one of the leaf springs are used for transfer of electrical power.

13. The power-transfer unit of claim 1, wherein the contact-initiation section and the contact-termination section are provided by a ramp sloping with and reverse to said first direction, respectively.

14. The power-transfer unit of claim 1, wherein the total length of the contact-initiation section and the contact termination section exceeds half the length of the intermediate section.

15. The power transfer unit of claim 1, wherein each support comprises two, individually suspended power bars.

16. A power bar adapted for arrangement in a power transfer unit according to claim 4, said power bar comprising
    attachment points for two leaf-springs and for a coil spring, and
    a contact-initiation section, a contact-termination section, and an intermediate section therebetween.

17. A power-transfer unit for a sealing unit of a packaging machine that seals packaging material, the power-transfer unit comprising:
    a support configured to be attached to a sealing unit;
    a power bar configured to contact a brush of a sealing jaw, the power bar including a conductor part made of conductive material and comprising a contact-initiation section in which contact pressure between the power bar and the brush increases, a contact-termination section in which contact pressure between the power bar and the brush decreases, and an intermediate section positioned between the contact-initiation section and the contact-termination section in which contact pressure between the power bar and the brush remains constant, the intermediate section possessing a contact surface configured to contact the brush;
    the power bar being resiliently suspended in the support and being moveable along a first direction normal to the contact surface of the intermediate section; and
    the power bar being suspended in the support by a first leaf spring interconnecting the support and the power bar.

18. The power-transfer unit of claim 17, further comprising a second leaf spring by which the power bar is suspended in the support.

19. The power-transfer unit of claim 18, wherein the first and second leaf springs are parallel to one another, are spaced apart from one another and possesses substantially the same length.

20. The power-transfer unit of claim 17, further comprising a coil spring between the support and the power bar to apply a biasing force to the power bar in the first direction.

* * * * *